US012791253B2

(12) United States Patent
Iglauer-Angrik et al.

(10) Patent No.: US 12,791,253 B2
(45) Date of Patent: Nov. 10, 2026

(54) SEPARATING DEVICE, TREATMENT INSTALLATION AND METHOD FOR TREATING WORKPIECES

(71) Applicant: Dürr Systems AG, Bietigheim-Bissingen (DE)

(72) Inventors: Oliver Iglauer-Angrik, Stuttgart (DE); Kevin Woll, Heilbronn (DE); Andreas Neu, Ammerbuch (DE)

( * ) Notice: Subject to any disclaimer, the term of this patent is extended or adjusted under 35 U.S.C. 154(b) by 671 days.

(21) Appl. No.: 18/258,490

(22) PCT Filed: Dec. 15, 2021

(86) PCT No.: PCT/DE2021/101007
§ 371 (c)(1),
(2) Date: Jun. 20, 2023

(87) PCT Pub. No.: WO2022/135633
PCT Pub. Date: Jun. 30, 2022

(65) Prior Publication Data
US 2024/0310122 A1 Sep. 19, 2024

(30) Foreign Application Priority Data
Dec. 21, 2020 (DE) ..................... 10 2020 216 427.4

(51) Int. Cl.
*F26B 21/50* (2026.01)
*F26B 3/04* (2006.01)

(52) U.S. Cl.
CPC ................ *F26B 21/50* (2026.01); *F26B 3/04* (2013.01); *F26B 2210/12* (2013.01)

(58) Field of Classification Search
CPC .. F26B 21/50; F26B 21/55; F26B 3/04; F26B 2210/12; F26B 15/12; F26B 21/25; F26B 25/12; F26B 25/008; B05D 3/0406; B05D 3/0413; B65G 11/00; B65G 47/74; F24F 9/00
See application file for complete search history.

(56) References Cited

U.S. PATENT DOCUMENTS 3,011,230 A 12/1961 Potapenko
3,511,162 A 5/1970 Truhan
3,805,410 A 4/1974 Rupp
(Continued)

FOREIGN PATENT DOCUMENTS

CN 108120259 A 6/2018
DE 7234044 U 12/1972
(Continued)

OTHER PUBLICATIONS

Translation, JP-03275160-A (Year: 1991).*
(Continued)

*Primary Examiner* — Jessica Yuen
(74) *Attorney, Agent, or Firm* — Hanley, Flight & Zimmerman, LLC

(57) ABSTRACT

In order to provide a separating device for a workpiece treatment installation, which can be operated cost-effectively and enables an efficient separating effect, it is proposed that the separating device comprises one or more guide devices by means of which at least one separating fluid can be introduced into a connecting region arranged or formed between two spatial regions.

17 Claims, 7 Drawing Sheets

(56) References Cited

U.S. PATENT DOCUMENTS

| | | | |
|---|---|---|---|
| 6,195,913 | B1 | 3/2001 | Canet et al. |
| 2013/0232801 | A1 | 9/2013 | Wieland et al. |
| 2018/0238622 | A1 | 8/2018 | Wieland et al. |
| 2020/0158432 | A1 | 5/2020 | Sakita et al. |
| 2020/0256570 | A1 | 8/2020 | Kondo |
| 2021/0229925 | A1 | 7/2021 | Iglauer-Angrik et al. |
| 2021/0231370 | A1 | 7/2021 | Iglauer-Angrik et al. |
| 2022/0341665 | A1 | 10/2022 | Iglauer-Angrik et al. |

FOREIGN PATENT DOCUMENTS

| | | | |
|---|---|---|---|
| DE | 202004014233 | U1 | 12/2004 |
| DE | 102010054822 | A1 | 7/2012 |
| DE | 102019213430 | A1 | 3/2021 |
| EP | 2746708 | A2 | 6/2014 |
| FR | 2973100 | A1 | 9/2012 |
| GB | 579187 | A | 7/1946 |
| JP | S5318853 | A | 2/1978 |
| JP | S54106961 | A | 8/1979 |
| JP | H03275160 | A | 12/1991 |
| JP | H08103713 | A | 4/1996 |
| JP | H09287873 | A | 11/1997 |
| JP | 4821586 | B2 | 11/2011 |
| JP | 6745834 | B2 | 8/2020 |
| WO | 2012055634 | A1 | 5/2012 |
| WO | 2020001706 | A1 | 1/2020 |
| WO | 2020001707 | A1 | 1/2020 |

OTHER PUBLICATIONS

European Patent Office, “Communication pursuant to Article 94(3) EPC,” issued in connection with European Patent Application No. 21 834 720.1, dated Feb. 26, 2025, 12 pages. [English machine translation included.].

International Searching Authority, “International Search Report and Written Opinion,” issued in connection with International Application No. PCT/DE2021/101007, Mar. 22, 2022, 14 pages, with English translation of the International Search Report.

* cited by examiner

SEPARATING DEVICE, TREATMENT INSTALLATION AND METHOD FOR TREATING WORKPIECES

RELATED APPLICATION

This application is a national phase of international application No. PCT/DE2021/101007 filed on Dec. 15, 2021, and claims the benefit of German application No. 10 2020 216 427.4 filed on Dec. 21, 2020, which are incorporated herein by reference in their entirety and for all purposes.

FIELD OF DISCLOSURE

The present disclosure relates to a separating device which can be used, for example, as a lock in a treatment installation for treating workpieces. The present disclosure further relates to a treatment installation for treating workpieces and also to a method for treating workpieces. The workpieces to be treated are in particular vehicle bodies, wherein a treatment process can be, for example, a coating process, in particular a painting process, or a drying process.

In the broadest sense, drying of the workpieces is here a treatment of the workpiece such that a layer previously applied to the workpiece dries and/or cures on the workpiece in order to complete a coating process.

In treatment processes of this kind, solvents can be released, which must not be allowed to enter an environment of the treatment installation or at most in small quantities. For example, locks can be provided for this purpose at an inlet or outlet of a treatment space, for example hot-air locks. Tightness and energy efficiency are decisive for the operation of such locks. For example, heated fresh air can be supplied to a lock, said air then being contaminated by mixing with solvent-loaded air from a treatment space such that it has to be thermally cleaned as exhaust air. This results in a high energy requirement for the operation of the lock.

BACKGROUND

For example, a lock is known from WO 2020/001706 A1, with which a mechanical component for at least partially closing an opening cross-section of the lock can be selectively introduced into a conveying path for conveying the workpieces or removed from the same. However, the flow guidance provided here can occasionally lead to condensate formation, particularly in the case of high solvent concentrations.

SUMMARY

The object of the present disclosure is therefore to provide a separating device for separating two spatial regions which has an optimized separating effect and/or increased energy efficiency.

This object is achieved according to the disclosure by a separating device according to independent claim 1.

The separating device preferably comprises one or more guide devices by means of which at least one separating fluid can be introduced into a connecting region arranged or formed between the two spatial regions.

As an alternative or in addition thereto, it can be provided that the separating device comprises a movable baffle element, which can be selectively introduced into or removed from the connecting region in order to selectively reduce or increase an opening cross-section of the connecting region.

A combination of several, for example two, guide devices with a movable baffle element is particularly preferred.

The separating device is in particular a lock device and serves to minimize a fluid exchange between the two spatial regions.

It is preferably provided that the separating device comprises at least one supply device for supplying at least one separating fluid to the one or more guide devices.

In particular, it can be provided that the separating device comprises a plurality of supply devices for supplying mutually different separating fluids to a plurality of guide devices.

The movable baffle element can preferably be moved automatically, in particular by a motor, into the connecting region or be removable therefrom, in particular removable only while one or more workpieces is being conveyed out of the connecting region.

The movable baffle element is preferably a device different from the one or more guide devices.

In particular, the movable baffle element is a baffle reducing the opening cross-section of the connecting region at least in the introduced state of the movable baffle element.

It may be advantageous if the one or more guide devices are also in each case designed as a baffle reducing the opening cross-section of the connecting region, in particular in relation to a spatial boundary of the connecting region formed by a ceiling wall, a floor wall and two side walls.

The separating device preferably comprises a drive device for driving the baffle element and a positioning device, preferably different therefrom, by means of which the baffle element can be automatically brought into the open position in the event of a failure of the drive device.

The baffle element is preferably arranged on a rotatable shaft or comprises a rotatable shaft.

The baffle element, in particular a guide plate of the baffle element, is preferably arranged so as to be pivotable about a substantially horizontal axis.

The baffle element is preferably arranged on an upper side of the connecting region in relation to the direction of gravity, in particular in the region of a ceiling wall of the connecting region.

The baffle element can preferably be introduced into the connecting region from above, in particular pivoted in.

Preferably, the separating device or a treatment installation provided with the separating device comprises a conveying system for conveying the workpieces, wherein the baffle element in a closed position thereof preferably projects into a movement path of the workpieces.

It can be advantageous if a control device and/or sensor device of the separating device is provided, by means of which it is possible to detect a workpiece approaching the connecting region between the two spatial regions or already arranged before or in the connecting region, wherein by means of the control device and/or the sensor device the movable baffle element can preferably be brought from a closed position into an open position and a movement path of the workpiece in the connecting region can thereby be released.

It can be advantageous if the conveyor system comprises an acceleration device by means of which a workpiece can be conveyed through the connecting region at an increased speed and/or with a reduced cycle time in comparison to a conveying speed and/or cycle time in the treatment space.

A conveyor system is in particular a conveyor device, for example an indexing conveyor, rail conveyor, roller conveyor, etc.

It can be advantageous if the separating device comprises at least two guide devices for supplying at least two separating fluids in the connecting region.

The separating device preferably comprises two supply devices, whereby in each case a separating fluid can be supplied in each case to a guide device in each case by means of a supply device.

At least one separating fluid is preferably fresh air or comprises fresh air, for example heated fresh air.

A further separating fluid is preferably circulating air or comprises circulating air.

In particular, it can be provided that the at least two separating fluids are formed by a separating fluid taking the form of fresh air and a separating fluid taking the form of circulating air.

The separating device preferably comprises at least two guide devices for supplying at least two separating fluids different from one another into the connecting region. A first separating fluid, in particular fresh air, for example heated fresh air, can preferably be supplied to the connecting region by means of a first of the guide devices. A second separating fluid, in particular circulating air, can preferably be supplied to the connecting region by means of a second of the guide devices.

The separating fluids are preferably separating fluids different from one another in terms of their respective chemical composition and/or their respective temperature.

The first separating fluid, in particular fresh air, is in particular able to be drawn in from an environment of the separating device and/or conditioned and can then be supplied to one of the guide devices, preferably to the guide device which is arranged on a side of the separating device which faces away from a spatial region designed, for example, as a treatment space.

The second separating fluid, in particular circulating air, can preferably be discharged from a treatment space and can be supplied to one of the guide devices, preferably to the guide device which is arranged on a side of the separating device which faces a spatial region designed, for example, as a treatment space.

Such an arrangement is advantageous, for example, when the treatment space is a drying chamber of a dryer, in particular a heating region or a holding region of a dryer. Alternatively, it can be provided that the first separating fluid, in particular fresh air, in particular can be drawn in from an environment of the separating device and/or conditioned and can then be supplied to one of the guide devices, preferably to the guide device which is arranged on a side of the separating device which faces a spatial region designed, for example, as a treatment space.

The second separating fluid, in particular circulating air, is then preferably removable from a treatment space and can be supplied to one of the guide devices, preferably to the guide device which is arranged on one side of the separating device, which faces away from a spatial region designed, for example, as a treatment space.

Such an arrangement is advantageous, for example, when the treatment space is a cooling zone.

It can be advantageous if the separating device comprises a separating fluid recirculation, by means of which fluid, in particular the first separating fluid, can be discharged from a part of the connecting region which is supplied with a separating fluid, in particular the first separating fluid, and can be supplied again to the guide device for supplying this fluid, in particular the first separating fluid.

In particular when two different separating fluids are used in the separating device, one separating fluid, in particular a second separating fluid, for example circulating air, can hereby be used to separate a spatial region from a part of the connecting region which is supplied with the further separating fluid, in particular the first separating fluid. The further separating fluid, in particular the first separating fluid, is thereby protected against heavy contamination and can consequently be used repeatedly, in particular recycled or at least partially recirculated. In the case of fresh air being used as the first separating fluid, a continuous admixing of fresh air supplied from the outside into the fresh air being conducted in the circuit can be provided.

The separating fluid recirculation preferably comprises one or more extraction devices, in particular one or more floor extraction devices, for example one or more suction slots.

As a component of a separation fluid recirculation or also separately thereto, for example for discharging exhaust air to an environment or to an exhaust air post-treatment, a floor extraction device, in particular a suction slot, can be provided, wherein the floor extraction device is preferably arranged and/or formed in a floor region and/or a floor wall of the connecting region and serves for the extraction of fluid, in particular separating fluid, arranged directly above the floor extraction device.

The suction slot preferably extends transversely, for example perpendicular, to a conveying direction and/or connecting direction.

In one embodiment of the disclosure, it is provided that a floor extraction device is arranged in such a way that a separation fluid flow generated by means of a guide device is directed onto the floor extraction device.

The floor extraction device is preferably arranged and/or formed in an imaginary extension of one of the guide devices in the floor wall of the connecting region.

It can be advantageous if the floor extraction device comprises one or more suction slots and/or one or more suction slot sections of one or more suction slots. For example, it can be provided that a suction slot which extends transversely, in particular substantially perpendicularly, to a conveying direction and/or connecting direction is designed to be interrupted one or more times, for example for conducting or assembling components of a conveying installation for conveying workpieces. Such a suction slot is then in particular formed from a plurality of suction slot sections which are oriented in a common main extension direction and are arranged one after the other in this direction. Furthermore, it can be provided that a plurality of suction slot sections are arranged offset to one another in relation to the connecting direction or conveying direction, in particular corresponding to an imaginary extension of guide element sections of one or more guide elements.

A floor extraction device is preferably arranged in a floor region between two guide devices, in particular in relation to a connecting direction or conveying direction. The floor extraction device is in particular an intermediate extraction device for the extraction of fluid in a part of the connecting region arranged between the two spatial regions, in particular between two guide devices.

Furthermore, it can be provided that one or more floor extraction devices, in particular all floor extraction devices, are arranged outside the connecting region, for example are arranged offset into a spatial region.

It can be advantageous if a standard volume flow or operating volume flow of the first separating fluid, in particular fresh air, is at least approximately 2000 $m^3$ per hour, in particular at least approximately 3000 $m^3$ per hour, for example at least approximately 4000 $m^3$ per hour.

Furthermore, it can be provided that a standard volume flow or operating volume flow of the first separating fluid, in particular fresh air, is at most approximately 10,000 $m^3$ per hour, in particular at most approximately 8000 $m^3$ per hour, for example at most approximately 7000 $m^3$ per hour.

It can be advantageous if a standard volume flow or operating volume flow of the second separating fluid, in particular circulating air, is at least approximately 4000 $m^3$ per hour, in particular at least approximately 6000 $m^3$ per hour, for example at least approximately 8000 $m^3$ per hour.

Furthermore, it can be provided that a standard volume flow or operating volume flow of the second separating fluid, in particular circulating air, is at most approximately 25,000 $m^3$ per hour, in particular at most approximately 18,500 $m^3$ per hour, for example at most approximately 12,000 $m^3$ per hour.

It can preferably be provided that a standard volume flow or operating volume flow of the second separating fluid, in particular circulating air, is greater than a standard volume flow or operating volume flow of the first separating fluid, in particular fresh air, for example by at least 50%, preferably by at least 100%.

A standard volume flow is in particular a volume flow of the fluid in question if this were under normal conditions according to DIN 1343.

An operating volume flow is, in particular, an actual volume flow of the fluid in question during operation of the separating device, in particular determined at or in relation to the respective volume flow during the supply to the connecting region.

One or more floor extraction devices are preferably provided and/or arranged in the connecting region and form, for example, intermediate extraction devices.

As an alternative or in addition thereto, provision can be made for one or more floor extraction devices to be arranged in one of the spatial regions, for example in a treatment space. It can then be advantageous if one or more guide devices are arranged and/or aligned in such a way that a separating fluid flow generated by means of these guide devices is directed in the direction of the spatial region and thus out of the connecting region in the direction of the one or more floor extraction devices in the spatial region. The one or more floor extraction devices then preferably form extraction devices which are arranged upstream or downstream outside the connecting region in relation to a conveying direction or connecting direction. Such upstream or downstream extraction devices can, in particular, optimize a separating fluid flow preferably in such a way that a thermal pressure from the spatial region, in particular from the treatment space, can be counteracted.

It can be advantageous if the one or more guide devices, in particular the first guide device and/or the second guide device, are each designed as a fixed, immovable baffle element.

The one or more guide devices, in particular the first guide device and/or the second guide device, preferably each comprise two guide elements, in particular guide plates.

The guide elements, in particular the guide plates, are preferably aligned at least approximately parallel to one another.

It can be advantageous if the guide elements, in particular the guide plates, at a lower end thereof in relation to a direction of gravity, form a supply opening for supplying the at least one separating fluid to the connecting region.

The supply opening is in particular a supply slot which preferably extends over at least approximately 50%, preferably at least approximately 70%, for example at least approximately 90% of a total width of a conveying path and/or of the connecting region.

The lower end of the guide elements, in particular of the guide plates, is preferably matched to a contour of the workpieces, for example, at least approximately complementary to an upper side of an outer contour of a workpiece that is to be conveyed through the connecting region.

By means of the guide elements, baffles are thus preferably formed which reduce an opening cross-section of the connecting region at least approximately to that shape and/or that cross-section which is required for conveying the workpieces through the connecting region.

In the case of a plurality of guide devices, each individual guide device preferably has such a contour adaptation.

The guide elements, in particular the guide plates, can each be of a one-piece or multi-piece design. In particular, it can be provided that the guide elements each comprise or form a plurality of guide element sections which form baffle sections of a baffle and/or supply opening sections of a supply opening, in particular of a supply slot.

The guide element sections of each guide element can in particular be arranged at a distance from one another and together with a base body of the guide device form a continuous supply opening, in particular a continuous supply slot.

The base body is, in particular, a supply funnel for supplying a separating fluid to the guide elements of the guide device, but can also be used or designed itself at least in sections as guide elements, in particular in that region in which no separate guide element or no separate guide element section is arranged, in particular fixed, for forwarding the separating fluid to the base body.

It can be advantageous if a plurality of guide devices of the separating device are arranged adjacent to one another in such a way that fluid curtains or fluid eddies produced by them directly adjoin one another, in particular without any other fluid flow still interposing.

A maximum distance of the guide devices from one another is preferably less than a maximum width of the connecting region in a transverse direction running horizontally and perpendicular to the connecting direction or conveying direction, in particular at most approximately half the maximum width of the connecting region in a transverse direction running horizontally and perpendicular to the connecting direction or conveying direction.

In particular, a maximum distance of the guide devices from one another is less than half of a maximum width of the connecting region in a transverse direction running horizontally and perpendicular to the connecting direction or conveying direction.

It can be advantageous if the one or more guide devices, in particular the first guide device and/or the second guide device, are each arranged such that an outflow direction of the separating fluid flowing out of a respective supply opening of the respective guide device runs obliquely to the direction of gravity.

For this purpose, the guide elements, in particular the guide plates, are preferably oriented obliquely to the direction of gravity.

An angle enclosed between the outflow direction and a horizontal extending perpendicular to the direction of gravity and/or enclosed between the guide elements and the horizontal is preferably between approximately 45° and approximately 85°, for example between approximately 60° and approximately 75°.

By means of the said angular orientations, an optimized flow guidance, in particular an optimized formation of flow eddies, can preferably be achieved in the separating device.

In particular when the separating device comprises a plurality of guide devices, it can be provided that the plurality of guide devices, in particular the first guide device and/or the second guide device, are arranged relative to one another in such a way that outflow directions of the separating fluid flowing out of a respective supply opening of the respective guide device enclose different angles with the horizontal.

In particular, it can be provided that the guide elements, in particular the guide plates, enclose mutually different angles with respect to the horizontal.

For example, it can be provided that the outflow directions of the separating fluid flowing out of a supply opening of a first guide device and/or the guide elements, in particular guide plates, of the first guide device enclose an angle between approximately 62° and 66°, for example approximately 64°, with the horizontal and/or the conveying direction.

Alternatively or additionally, it can be provided that an outflow direction of the separating fluid flowing out of a supply opening of a guide device, in particular of the second guide device, and/or the guide elements, in particular the guide plates, of this guide device encloses an angle between approximately 68° and 72°, in particular approximately 70°, with the horizontal and/or the conveying direction.

It can be provided that one or more of the guide elements each comprise a plurality of guide element sections which have different angular orientations from one another. In particular, a different guidance length for conducting the separating fluid in the connecting region can thereby be compensated.

For example, it can be provided that one or more guide element sections of one or more guide elements, which are shortened in comparison to one or more further guide element sections of this one or more guide elements, enclose a larger angle with the horizontal and/or the conveying direction than this one or more further guide element sections.

In one embodiment, it can be provided that one or more guide elements are in each case designed in two parts, three parts or more than three parts, and that one or more centrally arranged guide element sections are formed shorter with respect to a main flow direction of the separating fluid within the respective guide element section and enclose a larger angle with the horizontal and/or the conveying direction than one or more further guide element sections of the respective guide element.

In particular, it can be provided that guide element sections, adjacent to one another or are arranged at a distance from one another, of one or more guide elements enclose an angle with one another which is at least approximately 5°, for example at least approximately 8°.

Furthermore, alternatively or additionally, it can be provided that guide element sections, adjacent to one another or are arranged at a distance from one another, of one or more guide elements enclose an angle with one another which is at most approximately 20°, for example at most approximately 15°.

Two guide devices of the separating device are preferably arranged spaced apart from one another, in particular such that they do not overlap each other despite their, for example, oblique orientation, in particular with respect to a plan view along the direction of gravity from above.

The optional movable baffle element is preferably arranged between two of the guide devices in relation to a connecting direction which is oriented substantially perpendicular to a separating plane separating the two spatial regions from one another.

The connecting direction is in particular parallel to the conveying direction along which the workpieces can be conveyed through the connecting region.

The movable baffle element is preferably arranged between two guide devices in relation to the conveying direction along which objects, in particular workpieces, can be conveyed from one of the spatial regions into another of the spatial regions.

It can be provided that a first of the spatial regions is a treatment space for treating workpieces and/or that a second of the spatial regions is a treatment space for treating workpieces.

The first spatial region is, for example, a holding zone for holding the workpieces at a prespecified temperature. The second spatial region is, for example, a cooling zone for cooling the workpieces.

Furthermore, the separating device can be provided, for example, in a treatment device in such a way that the first spatial region is an environment of the treatment installation or a painting zone. The second spatial region is then, for example, an evaporation zone and/or a heating zone.

The separating device can in particular be an intermediate lock between two treatment installations and/or treatment chambers or an outer lock at an inlet or outlet of the treatment installation.

In one embodiment of the disclosure, several or all of the guide elements of each guide device, in particular the at least two guide elements of each guide device, can be arranged at least approximately parallel to one another.

In particular it can be provided that one or more or all of the guide elements of each guide device, in particular the at least two guide elements of each guide device, can together enclose an angle of at most approximately 10°, in particular at most approximately 5°, preferably at most approximately 2°.

The separating fluid is in particular air, for example conditioned and/or cleaned air and/or ambient air and/or shop air.

The separating device preferably provides for fluid separation of the two spatial regions, which means that the fluids arranged in the respective spatial regions are not mixed with one another, or are only mixed with one another slightly, across the spaces.

The separating device is used in particular to reduce or prevent fluid exchange between the fluids arranged in the two spatial regions.

The separating device can preferably be used to prevent hotter air from one of the spatial regions from being mixed with colder air from the other of the two spatial regions.

One or more or all of the guide elements preferably extend downward, starting from a ceiling region of one of the spatial regions or of both spatial regions.

In particular, one or more or all of the guide elements can be arranged, in particular fixed, on a ceiling of one or both spatial regions and can extend downward starting from this ceiling.

A ceiling is in particular a wall delimiting a spatial region or the two spatial regions at the top.

One or more or all of the guide elements can extend over at least approximately 70%, preferably at least approximately 90%, of a width of a passage opening interconnecting the two spatial regions.

In particular, one or more or all of the guide elements can extend in the horizontal direction over the entire width of the passage opening interconnecting the two spatial regions.

By supplying the separating fluid, a separating fluid curtain, in particular an air curtain, can preferably be produced, which curtain preferably extends over at least approximately 70%, for example at least approximately 90%, of a width of a passage opening interconnecting the two spatial regions. The separating fluid curtain, in particular the air curtain, preferably extends over the entire width of the passage opening interconnecting the two spatial regions.

It may be favorable for one or more or all of the guide elements to comprise metal plates or to be formed from metal plates.

One or more or all of the guide elements are preferably planar and/or flat.

It may be favorable for one or more or all of the guide elements to have an extent in two main directions of extension at least 100 times, preferably at least 500 times, the extent thereof in the thickness direction, which is perpendicular to the two main directions of extension.

A distance between two guide elements is preferably at most approximately 20 times, for example at most approximately 10 times, a material thickness of one or both guide elements.

For example, a distance between the two guide elements can be at most approximately 5 cm, for example at most approximately 2 cm.

It may be advantageous for at least two guide elements to be interconnected, for example by means of connecting pieces which extend in particular in parallel with a main flow direction of the separating fluid in the region between the at least two guide elements.

In one embodiment of the disclosure, one or more or all of the guide elements can extend, at least in portions, over at least approximately 5%, for example at least approximately 10%, preferably at least approximately 20%, of a maximum or average height of a passage opening interconnecting the two spatial regions.

In one embodiment of the disclosure, at least approximately 50%, preferably at least approximately 80%, for example at least approximately 90%, in particular 100%, of a volume flow of the separating fluid to be introduced between the two spatial regions can be introduced between the two spatial regions between the guide elements, in particular between the two guide elements.

In particular, the separating fluid can be introduced between the two spatial regions only between the two guide elements.

The guide device thus preferably comprises no other supply opening for supplying separating fluid than the supply opening which is formed on an end region of said supply device that is formed by the at least two guide elements.

The at least two guide elements form in particular a single and/or continuous slotted nozzle for supplying the separating fluid between the two spatial regions.

The separating device can comprise a blocking device for blocking the separating fluid.

The blocking device preferably comprises one or more blocking elements which prevent or at least reduce the spreading of a separating fluid flow into at least one of the two spatial regions.

One or more blocking elements are preferably arranged in a floor region of the separating device, for example arranged and/or fixed on a floor of one or both spatial regions.

One or more or all of the blocking elements are preferably designed as deflector elements, in particular deflector plates.

It may be favorable for one or more or all of the blocking elements to extend upward, starting from the floor region, in particular starting from the floor, in particular at least approximately vertically upward.

It may be favorable for one or more or all of the blocking elements of the blocking device to be offset in the parallel direction from a separating plane along which the two spatial regions can be separated by means of the separating device.

The separating plane is in particular formed at least approximately perpendicular to a conveying direction along which objects, in particular workpieces, can be conveyed through the connecting region.

It may be favorable for the separating device to comprise a discharge device for discharging the separating fluid.

The discharge device is arranged in particular in a floor region of the separating device, for example integrated in a floor of one or both spatial regions.

The discharge device preferably comprises one or more suction slots which are arranged in particular partially or at least approximately completely in parallel with the separating plane of the separating device.

It may be favorable for one or more or all of the suction slots to extend along one or more planes which are offset in the parallel direction from the separating plane.

One or more or all of the suction slots are preferably arranged and/or formed continuously along the relevant plane or are arranged and/or formed in multiple parts and discontinuously.

It may be advantageous for the discharge device, in particular an outlet opening, for example a suction slot, and one or more blocking elements of a blocking device of the separating device to be arranged on opposite sides of a separating plane of the separating device.

The one or more or all of the blocking elements of the blocking device are preferably offset relative to the separating plane, in particular starting from the separating plane, toward one of the spatial regions, whereas one or more or all of the outlet openings, in particular suction slots, are preferably offset relative to the separating plane, in particular starting from the separating plane, toward the other of the two spatial regions.

Such an arrangement can make it possible, in particular, for one or more separating fluid curtains to extend downwards substantially along the separating plane from the one or more guide elements and be extracted at one side in a floor region of the separating device, wherein at the same time a flow spreading towards the other side is prevented or at least reduced by means of the one or more blocking elements.

In this way, in particular, a particularly space-saving and flow-efficient separation of the two spatial regions is made possible.

It can be provided that the separating device comprises one or more blocking elements which influence, in particular locally block or deflect, a spreading of a flow.

The blocking elements are in particular a component of a blocking device or form such a blocking device.

The one or more blocking elements preferably reduce or prevent a spreading of one or more separation fluid flows into at least one of the two spatial regions adjacent to the connecting region.

A deflection region is preferably formed between each two blocking elements. In particular, three blocking elements and two deflection regions arranged in between them are provided.

The blocking elements are preferably arranged one after the other along the connecting direction and spaced apart from one another.

The blocking elements are designed substantially plate-like, in particular as baffle plates. Furthermore, it can be provided that the blocking elements are oriented at least approximately perpendicular to the connecting direction.

The one or more blocking elements each preferably extend over at least approximately 40%, preferably at least approximately 60%, in particular at least approximately 80%, of a clear overall width of the connecting region taken in the transverse direction.

A distance between two directly successive blocking elements is preferably at least approximately 50%, in particular at least approximately 80%, for example at least approximately 100%, and/or at most approximately 200%, preferably at most approximately 150%, of a total extension of a guide device along the connecting direction. In particular, the formation of a flow eddy advantageous for the separating effect of the separating device can thereby be optimized.

It can be provided that the separating device comprises one or more guide devices and two or more than two blocking elements arranged in a floor region of the separating device, wherein between the blocking elements one or more deflection regions are preferably formed for deflecting one or more fluid flows and/or for forming one or more flow eddies.

Furthermore, it can be provided that a flow eddy is formed or can be formed a) directly under a guide device or in each case directly under each of the guide devices; and/or b) in relation to a connecting direction between two guide devices.

It can be advantageous if, in relation to the connecting direction, which corresponds in particular to the conveying direction, a blocking element is arranged at least approximately in a region of an upper end of one of the guide devices and/or in relation to the connecting direction an, in particular further, blocking element is arranged at least approximately in a region of a lower end of a guide device, in particular of the same guide device. This guide device serves in particular to guide fresh air and/or to form one or two fresh air eddies.

An arrangement in a "region" is to be understood in particular as a deviation of the position along the connecting direction by at most approximately 30 cm, in particular at most approximately 15 cm.

A distance of these two blocking elements from one another is, for example, at least approximately 700 mm, in particular at least approximately 850 mm, and/or at most approximately 1200 mm, preferably at most approximately 1000 mm.

Furthermore, a blocking element, in particular a third blocking element, can be arranged at least approximately in a region of a lower end of another of the guide devices in relation to the connecting direction. In combination with the two blocking elements described above, a flow eddy can then in particular be produced between the two guide devices. A distance of this blocking element from the closest of the two further blocking elements is, for example, at least approximately 1000 mm, in particular at least approximately 1200 mm, and/or at most approximately 1500 mm, preferably at most approximately 1400 mm. This further guide device serves in particular to guide circulating air, wherein the circulating air flows into a inflow region, in particular into a drying chamber of a dryer, in particular via the third blocking element.

The separating device is particularly suitable for use in a treatment system for treating workpieces.

The present disclosure therefore also relates to a treatment system for treating workpieces, in particular a drying system for drying coated vehicle bodies.

The treatment system preferably comprises the following:

a treatment space for treating workpieces, which comprises one or more treatment space portions;

at least one separating device for separating two spatial regions, in particular a separating device according to the disclosure, wherein at least one treatment space portion forms one of the spatial regions which can be separated from another of the spatial regions by means of the at least one separating device.

In particular, the treatment system can comprise a plurality of separating devices, for example a plurality of separating devices according to the disclosure.

The treatment system preferably has one or more of the features and/or advantages described in connection with the separating device.

The other spatial region can be a further treatment space portion of the treatment space.

Alternatively, the other spatial region can be a spatial portion of a device different from the treatment system.

Furthermore, the other spatial region can alternatively be surroundings of the treatment system.

It may be favorable for the treatment system to comprise a conveyor device for conveying the workpieces, which conveyor device extends in particular through the separating device in a conveying direction of the conveyor device.

The separating plane of the separating device is oriented in particular obliquely, for example perpendicularly, to the conveyor device.

It may be favorable for the conveyor device to be an indexing conveyor device.

The separating plane preferably extends between two immediately adjacent positions or locations at which workpieces to be treated remain at least temporarily, for example due to indexed conveying.

In one step of a conveyor device designed as an indexing conveyor device, a workpiece is preferably conveyed from one indexing location (position, location) arranged in one of the spatial regions to a subsequent indexing location (position, location) arranged in the other spatial region.

In one embodiment of the disclosure, a lower face of one or more or all of the guide elements can be at least partially or at least approximately complementary to a conveying contour of the workpieces to be conveyed by means of the conveyor device.

In particular, a lower face of one or more or all of the guide elements is at least partially and/or at least approximately complementary to an upper face of a spatial region through which the workpieces travel when conveyed in the conveying direction.

The one or more guide devices of the separating device, in particular one or more or all of the guide elements, are preferably designed to be matched to a workpiece contour.

For example, if the treatment system is used to treat vehicle bodies, a lower face of one or more or all of the guide elements can have a region arranged further up in the vertical direction that is shaped like a roof region of the vehicle body, whereas a region of the lower face of one or more or all of the guide elements arranged further down in the vertical direction is shaped like a front hood region.

Furthermore, an intermediate region of the lower face of one or more or all of the guide elements that is oriented obliquely to the vertical direction and interconnects the region arranged further up and the region arranged further down can be provided, which intermediate region is shaped like a windshield region of the vehicle body.

In one embodiment of the disclosure, the treatment system comprises a plurality of treatment space modules.

Each treatment space module preferably surrounds a treatment space portion and/or forms an indexing location of an indexing conveyor device.

The separating device is arranged, for example, between two treatment space modules or integrated between two treatment space modules.

One or both treatment space modules adjoining a separating device preferably have no suction for a circulation device. As a result, flow guidance can preferably be optimized in favor of a separating fluid flow.

In particular, a separating fluid curtain, for example an air curtain, can be produced in a substantially vertical direction, in particular while minimizing a transverse flow of a circulating air flow that reduces the separating effect.

A method for separating two spatial regions can preferably be carried out by means of the separating device.

The method for separating two spatial regions by means of a separating device is in particular a method for separating two spatial regions by means of a separating device according to the disclosure.

In the method for separating two spatial regions, a separating fluid is preferably introduced between the two spatial regions by means of a supply device.

The separating fluid is preferably guided by means of at least two guide elements.

The at least two guide elements are preferably designed as guide plates.

It can be advantageous for the at least two guide elements to be arranged at least approximately in parallel with one another.

The method according to the disclosure for separating two spatial regions is particularly suitable for use in a method for treating workpieces.

The present disclosure therefore also relates to a method for treating workpieces, in particular for drying coated vehicle bodies.

In this regard, the disclosure is based on the object of providing a method for treating workpieces, with which spatial regions to be separated from one another are optimized as regards the separating effect and/or energy efficiency.

This object is achieved by the features of the independent method claim.

The method for treating workpieces preferably comprises the following:

separating two spatial regions from one another by means of a separating device according to the disclosure;

conveying workpieces through the separating device.

One or more of the methods described preferably have one or more of the features and/or advantages described in connection with the separating device according to the disclosure and/or the treatment system according to the disclosure.

Furthermore, the separating device, the treatment system and/or one or more of the methods described preferably have one or more of the features and/or advantages described below:

The separating device can, for example, form an entrance lock/inlet lock or exit lock/outlet lock of any system, for example a treatment system.

Furthermore, the separating device can form an intermediate lock within a treatment system or between two treatment systems.

The formation of one or more flow eddies is preferably prevented or at least minimized or, however, optimized by means of the separating device.

The separating fluid is supplied to one or more or all of the guide elements, in particular in a region between two guide elements, preferably via a mouth portion, which is for example funnel-shaped, and which is arranged in particular in a ceiling region, for example on a ceiling wall.

Via the mouth section, a guide channel formed between the two guide elements, for example, is in fluidic communication preferably with a pressure chamber, which is formed, for example, in a pressure space chamber (fluid chamber) above one or both spatial regions.

Such a pressure space chamber can, for example, be provided with one or more filter elements and/or one or more fans in order to clean and/or drive the separating fluid before it is supplied between the two spatial regions.

The mouth portion preferably extends at least approximately over the entire width of the at least two guide elements and/or the passage opening.

The temperature of the separating fluid is preferably greater than the temperature of the fluids in one or both spatial regions.

The supply is preferably designed to be self-regulating, in particular in order to achieve as uniform an air flow as possible in the separating plane of the separating device. In particular, matching the guide elements to the workpiece contour results in a flow path that varies across the width of the guide elements, in particular with regard to an unguided flow path, wherein sections with a shorter guided flow path between the guide elements result in an overall lower flow resistance such that, despite unguided path routes of different lengths for the separating fluid along the separating plane, a preferably at least approximately uniform separating fluid flow can be obtained. In particular, a uniform separating fluid curtain can be produced in this way.

In a particularly preferred embodiment of the disclosure, it is provided that the separating device comprises a guide device designed as a silhouette-based lock curtain, wherein the guide device of the separation serves to form a spatial region designed for example as a holding zone and for example is supplied with circulating air, in particular hot circulating air, from an adjacent treatment space, in particular a holding zone module, of the treatment installation.

Furthermore, in this embodiment, a movable baffle element designed as a lock shield is preferably provided, which serves as a purely physical barrier in a state introduced into the connecting region, in particular in a folded-down state, said state being between cycle changes, in particular being in order to counteract a thermal pressure of a hot atmosphere in the treatment space.

Finally, in the embodiment, a further guide device is preferably provided, which is preferably designed as a silhouette-based lock curtain, for example, and which preferably serves the separation into a spatial region, for example designed as a cooling zone, and/or which is supplied with, for example, hot fresh air. The hot fresh air is in particular conditioned, in particular heated, by means of a fresh air heat exchanger.

The one or more guide devices are preferably oriented obliquely to the direction of gravity and obliquely to the horizontal such that the separating fluid flowing out of the guide devices has a flow component which counteracts a thermal pressure arising from the temperature in one of the spatial regions.

A separation fluid flow can be stabilized, for example, by means of one or two floor extraction devices, in particular by means of one or two floor extraction devices for each guide device.

A floor extraction device can in particular be a slotted suction device in a floor wall of the connecting region and/or of a treatment space.

The separating fluid supplied can preferably be cleaned by means of one or more filter devices. One or more filter devices are in particular arranged in a ceiling region, in particular above a ceiling wall of the connecting region, and/or accessible from the connecting region.

In a state of the movable baffle element introduced into the connecting region, the baffle element preferably adjoins one of the guide devices. In particular, a component of the baffle element that produces the baffle function, in particular a guide plate (baffle plate), runs at least approximately parallel and directly adjacent to or abutting a guide element, in particular a guide plate, of a guide device.

The movable baffle element thus preferably serves to guide a separating fluid flow, in particular a fresh air curtain.

In particular, the described combination of one or more, in particular two, guide devices and a movable baffle element can preferably significantly reduce a required fresh air volume flow for an efficient separating effect.

Even in the case of a transverse conveying of the workpieces, with which the workpieces are conveyed such that their longitudinal direction is oriented transversely, in particular substantially perpendicularly, and, for example, horizontally to the conveying direction, an efficient separating effect can preferably be achieved.

In particular, it can be provided that the workpieces are conveyed in a transverse orientation in which their longitudinal axis is oriented transversely, in particular perpendicularly, and preferably horizontally to the conveying direction. The opening cross-sections in the connecting region formed by one or more guide devices are preferably only partially reduced, in particular at most approximately 60%, preferably at most approximately 40% by means of one or more movable baffle elements. Even then, an efficient separating effect between the spatial regions is preferably possible.

Further preferred features and/or advantages of the disclosure are found in the following description and the drawings illustrating one embodiment.

Figure 1:
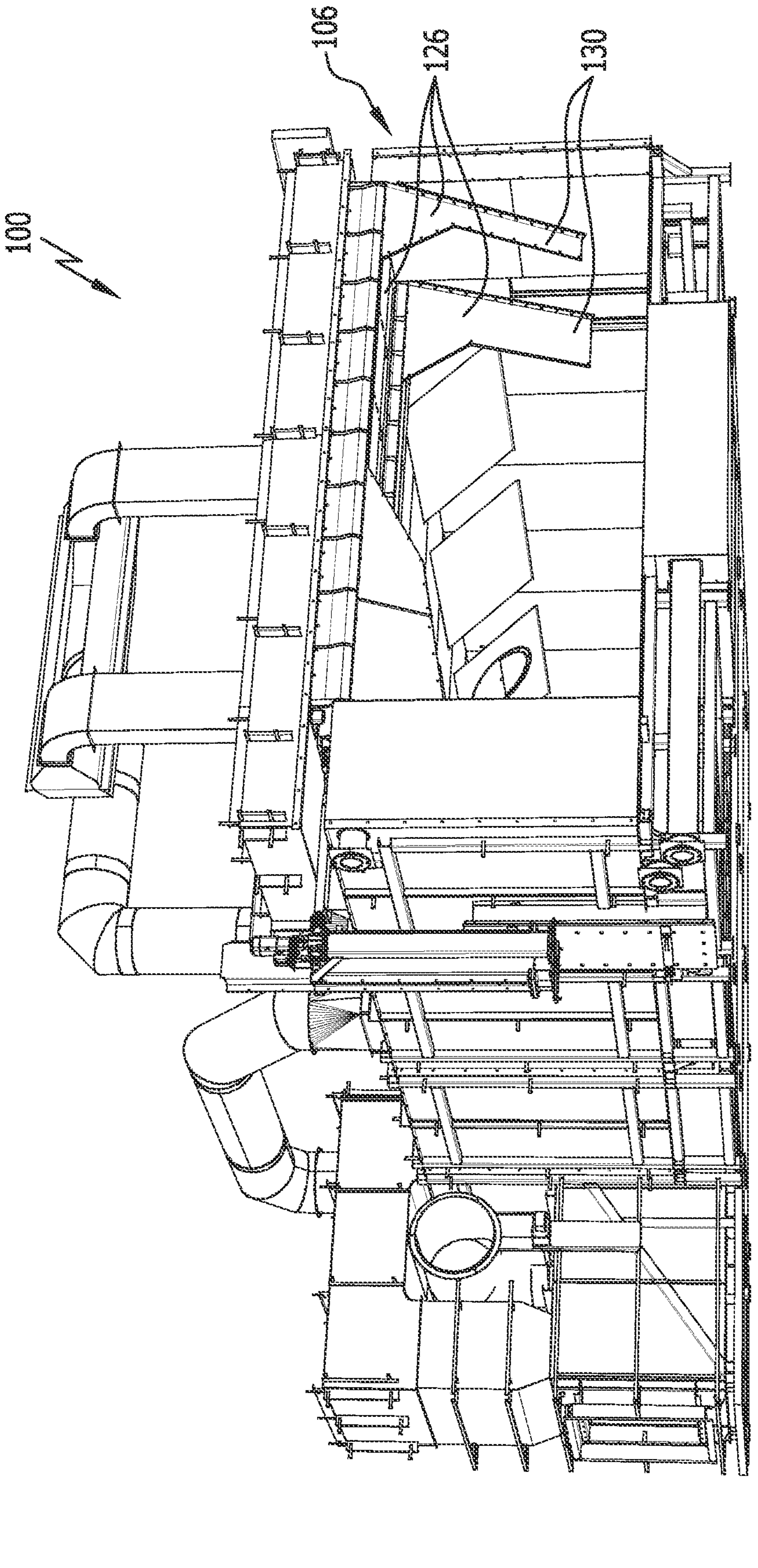
FIG. 1 shows a schematic perspective view of a treatment installation comprising a separating device for separating two spatial regions.

The same or functionally equivalent elements are provided with the same reference signs in all figures.

DETAILED DESCRIPTION OF THE DRAWINGS

An exemplary embodiment of a treatment installation 100 illustrated in FIGS. 1 to 6 serves for the treatment of workpieces (not shown), for example vehicle bodies of passenger cars.

The treatment installation 100 serves in particular for the coating or aftertreatment of a coating. For example, the treatment installation 100 is or comprises a drying installation or drying device for drying and/or curing a coating applied to a workpiece.

The treatment installation 100 comprises a plurality of spatial regions 102. In addition, the treatment installation 100 is surrounded by one or more further spatial regions 102. For example, an environment of the treatment installation 100 is likewise a spatial region 102 in the sense of the present description.

One or more spatial regions 102 within the treatment installation 100 are, for example, treatment spaces 104 for carrying out a treatment process.

The spatial regions 102 preferably have different atmospheres, i.e. different air compositions or air temperatures.

To separate the spatial regions 102 from one another, the treatment installation 100 comprises one or more separating devices 106.

The separating device 106 serves to reduce an air exchange between two spatial regions 102. One of the spatial regions 102 is, for example, a treatment space section 108 of a treatment space 104.

The treatment space 104 is, for example, a holding zone in which the workpieces to be treated can be held at a prespecified temperature.

For this purpose, the holding zone preferably comprises a plurality of treatment installation modules, which form a plurality of treatment space sections 108 of the treatment space 104.

In particular, a plurality of supply openings 110 for supplying hot air into the treatment space 104 and a plurality of discharge openings 112 for discharging the air from the treatment space 104 are provided in the treatment space 104 in order to bring the workpieces into the treatment space 104 up to a desired temperature or to keep them at a desired temperature. The air in the treatment space 104 is guided in particular in a circulating air guide. The air in the treatment space 104 is thus preferably at least largely circulating air.

The treatment of the workpieces in the treatment space 104 releases in particular solvents which can accumulate in the circulating air.

By means of the separating device 106, the solvents are in particular to be prevented from being carried further into an adjoining spatial region 102.

The adjoining spatial region 102, which is to be separated from the treatment space 104 by means of the separating device 106, is, for example, a cooling zone (not shown) or surroundings of the treatment installation 100.

Between the two spatial regions 102 there is thus in particular a temperature gradient which generates a thermal pressure from the treatment space 104 designed for example as a holding zone.

This thermal pressure can in particular lead to hot air flowing out of a spatial region 102 into a cooler spatial region 102 and leading to condensate formation as a result of the cooling.

This is preferably prevented by means of the separating device 106.

For this purpose, the separating device 106 is integrated in particular into the treatment installation 100.

In particular, the separating device 106 is preferably connected to a treatment space 104 or is arranged between two treatment spaces 104.

In particular, the spatial regions 102 to be separated from one another by means of the separating device 106 preferably have, together with the separating device 106, a common housing 114 in the treatment installation 100. The housing 114 comprises in particular a ceiling wall 116, a floor wall 118 and two side walls 120, which surround at least approximately a cuboidal interior of the treatment installation 100.

A conveying device (not shown) for conveying the workpieces along a conveying direction 122 extends through the treatment space 104.

Thereby, the separating device 106 is arranged between two spatial regions 102, in particular between two treatment spaces 104, in particular in relation to the conveying direction 122.

With regard to the conveying direction 122, a cross-section which is substantially uniform at least due to the housing 114 results along the spatial regions 102 through the separating device 106.

In order to reduce an air exchange between the spatial regions 102, the separating device 106 preferably comprises one or more baffles 126 which, for example, project from the ceiling wall 116 into a connecting region 128 of the separating device 106 formed between the two spatial regions 102 and thus reduce the opening cross-section.

In this case, two fixed baffles 126 are preferably provided, which are formed in particular by guide devices 130.

A further baffle 126 is preferably formed by a movable baffle element 132.

The separating device 106 preferably comprises one or more, for example two, supply devices 134 for supplying one or more separating fluids to the guide devices 130.

For example, fresh air can be supplied to a first guide device 130, while circulating air for example can be supplied to a second guide device 130.

Thereby, the circulating air can be discharged in particular from a treatment space 104 and can be supplied to one of the guide devices 130, preferably to the guide device 130, which is arranged on the side of the separating device 106 facing the treatment space 104.

A further supply device 134 for the further guide device 130 serves, for example, to supply fresh air, in particular heated fresh air.

For this purpose, the supply device 134 comprises in particular a heating device (not shown) for heating sucked-in fresh air, in particular shop air.

Furthermore, each supply device 134 can have, in addition to an (optional) heating device, a cooling device, a dehumidifying device and/or a humidifying device in order to be able to condition as required the separating fluid to be supplied.

Figure 4:
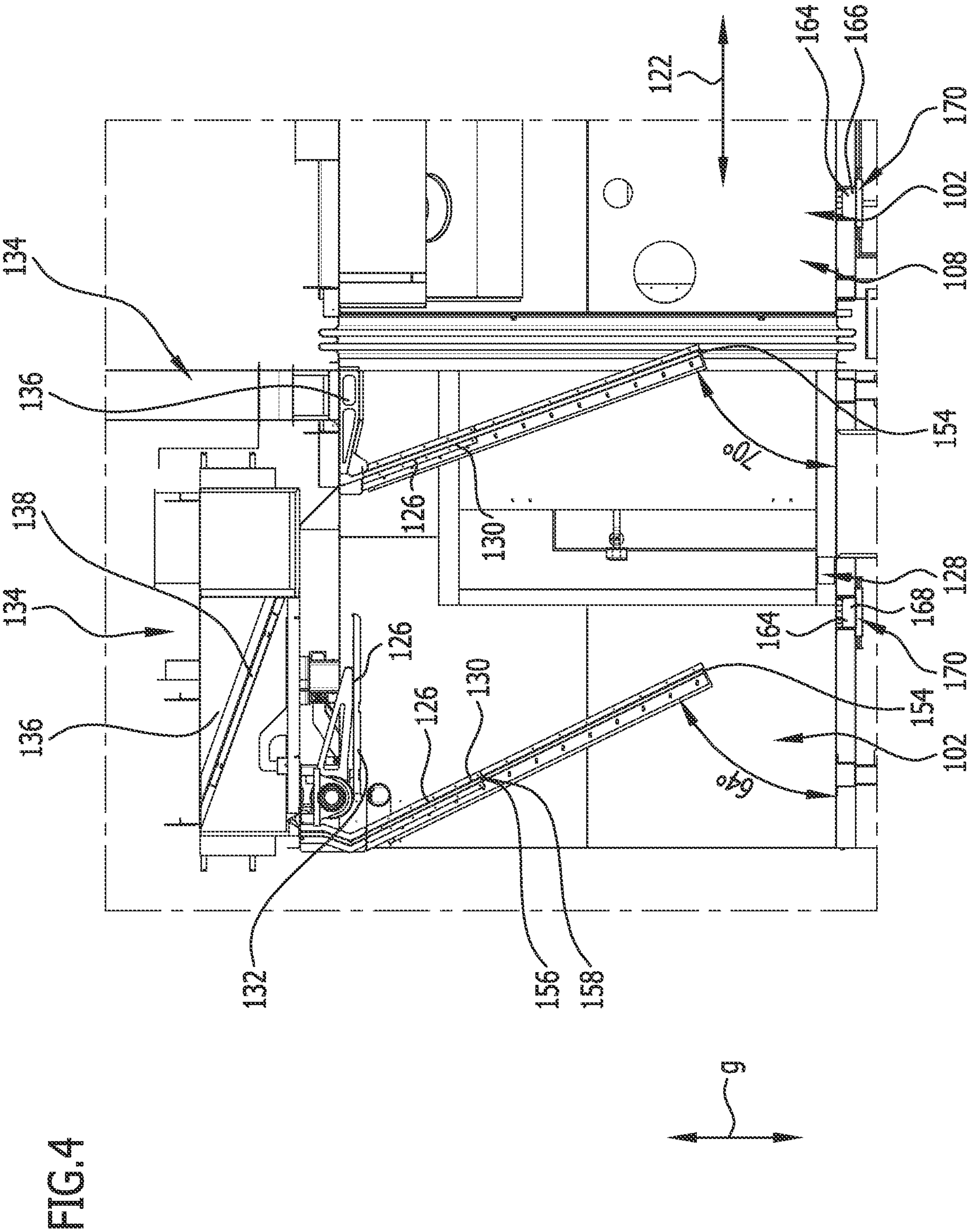
FIG. 4 shows an enlarged vertical longitudinal section through the separating device of the treatment installation from FIG. 1.
Figure 5:
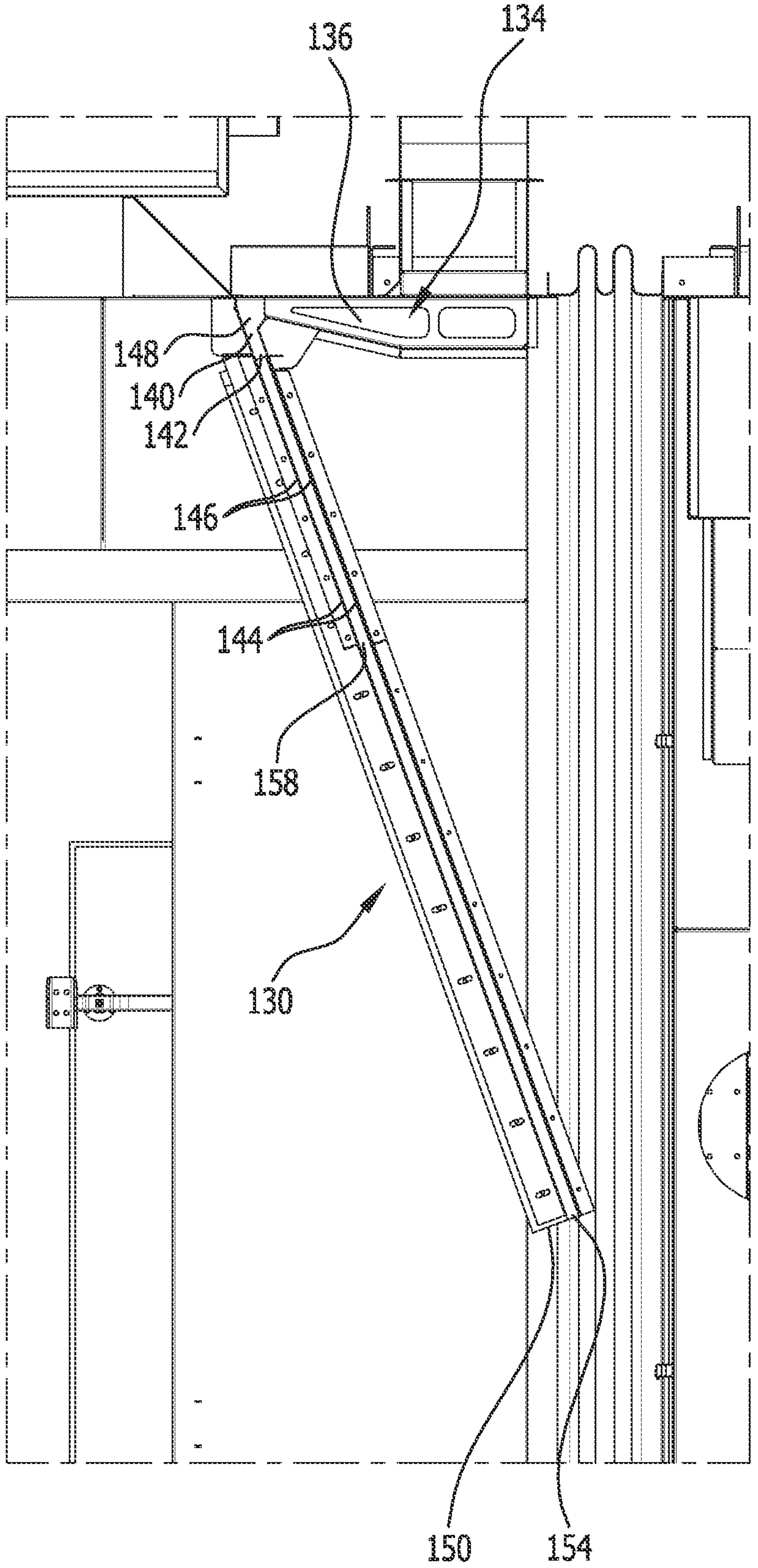
FIG. 5 shows an enlarged view of a guide device of the separating device.
Figure 6:
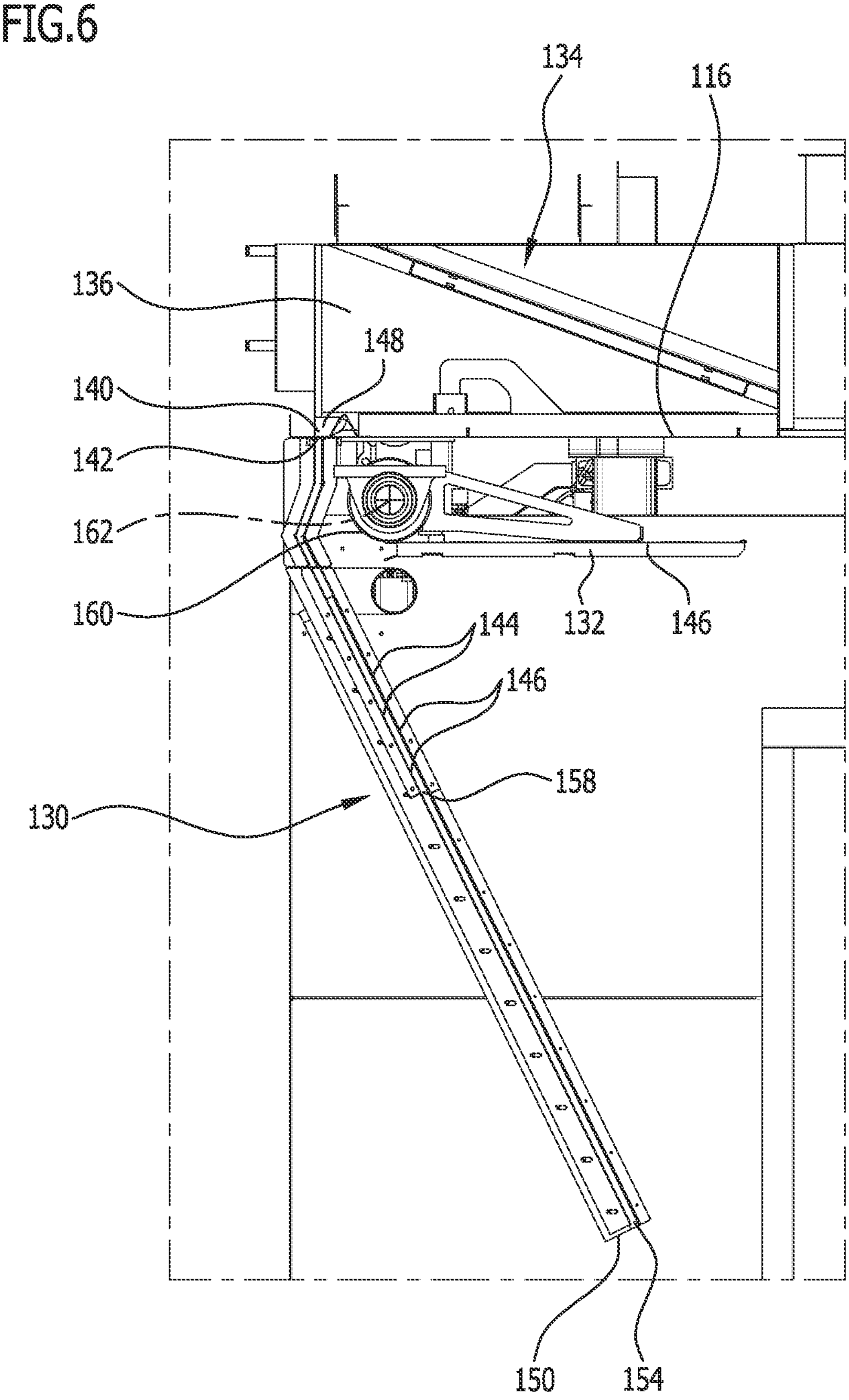
FIG. 6 shows an enlarged view of a movable baffle element and a further guide device of the separating device.

As can be seen in particular from FIGS. 4 to 6, the supply devices 134 preferably each comprise a fluid chamber 136 which can be provided, for example, with a filter element 138 and serves for the uniform supply of separating fluid to the respective guide device 130.

For this purpose, each fluid chamber 136 comprises a slot-shaped outlet opening 140, which directly adjoins an inlet opening 142 of the respective guide device 130. The inlet opening 142 is also preferably designed in each case in the shape of a slot.

The guide devices 130 each comprise two guide elements 144, which are designed, for example, as guide plates 146 and are arranged substantially parallel to one another.

Between the guide elements 144, a gap is formed, which serves to guide the separating fluid from the upper end 148, in relation to the direction of gravity g, of the guide device 130 up to a lower end 150, in relation to the direction of gravity g, of the guide device 130.

The lower end 150 of each guide device 130 is preferably matched to an outer contour of an upper side of the workpieces to be conveyed through the treatment installation 100.

The guide device 130 thus extends downwards to a different extent from the ceiling wall 116 in a transverse direction (width direction) 152, oriented perpendicular to the conveying direction 122 and horizontally, of the separating device 106.

A slotted nozzle 154 formed at the lower end of the guide device 130 by means of the two guide elements 114 of the guide device 130 thus opens into the connecting region 128 at different heights above the floor wall 118.

The slotted nozzle 154 forms in particular a supply opening 156 and/or a supply slot 158 of the respective guide device 130.

As can be seen in particular from FIG. 4, the guide devices 130 are both arranged obliquely in relation to the horizontal and the vertical directions and also in relation to the conveying direction 122.

The guide devices 130 each enclose an angle between approximately 60° and approximately 75° with the horizontal.

For example, a guide device 130 encloses an angle of 70° with the horizontal, while a further guide device 130 encloses an angle of 64° with the horizontal.

The two guide devices 130 are therefore preferably not arranged parallel to one another, but rather in such a way that the guide elements 144, in particular the guide plates 146, of the two guide devices 130 run obliquely to one another, for example at an angle of 6° to one another.

By means of the guide devices 130, in particular, flow eddies can be produced from separating fluid in the connecting region 128 and/or in the one or both spatial regions 102. As a result, fluid, in particular air, can preferably be prevented from flowing out from the one spatial region 102 into the further spatial region 102, or this at least minimized.

The movable baffle element 132 serves to further optimize the separating effect of the separating device 106.

As can be seen in particular in FIG. 6, this movable baffle element 132 preferably comprises a guide plate 146, which is mounted on or by means of a shaft 160 of the baffle element 132 so as to be rotatable or pivotable about a horizontal axis of rotation 162, for example.

In the open position of the movable baffle element 132 shown in FIG. 6, the guide plate 146 is arranged substantially horizontally and/or parallel to the ceiling wall 116.

In this state, in particular a workpiece can be conveyed unhindered through the separating device 106.

The baffle element 132, in particular the guide plate 146 of the baffle element 132, can preferably be introduced into the connecting region 128 by a rotary or pivoting movement, in particular pivoted downwards in the direction of gravity g.

The guide plate 146 of the movable baffle element 132 then runs in particular parallel or at least approximately parallel to a guide element 144, in particular a guide plate 146, of one of the guide devices 130.

In this closed position of the movable baffle element 132, the guide plate 146 of the movable baffle element 132 projects, at least in sections, further from the ceiling wall 116 downwards into the connecting region 128 than does at least partially the adjoining guide device 130, so that an opening cross-section is reduced.

The guide plate 146 of the movable baffle element 132 in this case projects in particular into a movement path of the workpieces to be conveyed in order to increase the separating effect of the separating device 106.

In order to enable workpieces to be conveyed through, the movable baffle element 132 is then temporarily brought from the closed position into the open position.

By means of the guide plate 146 of the baffle element 132, a mechanical separation between the spatial regions 102 to be separated from one another is thus at least temporarily optimized, so that the volume flows of the separating fluids in the guide devices 130 required for effective air separation can be minimized. Ultimately, this can achieve an optimized sealing effect with regard to the discharge of solvents, for example. In addition, the energy requirement required for the operation of the separating device 106 can be minimized.

Figure 2:
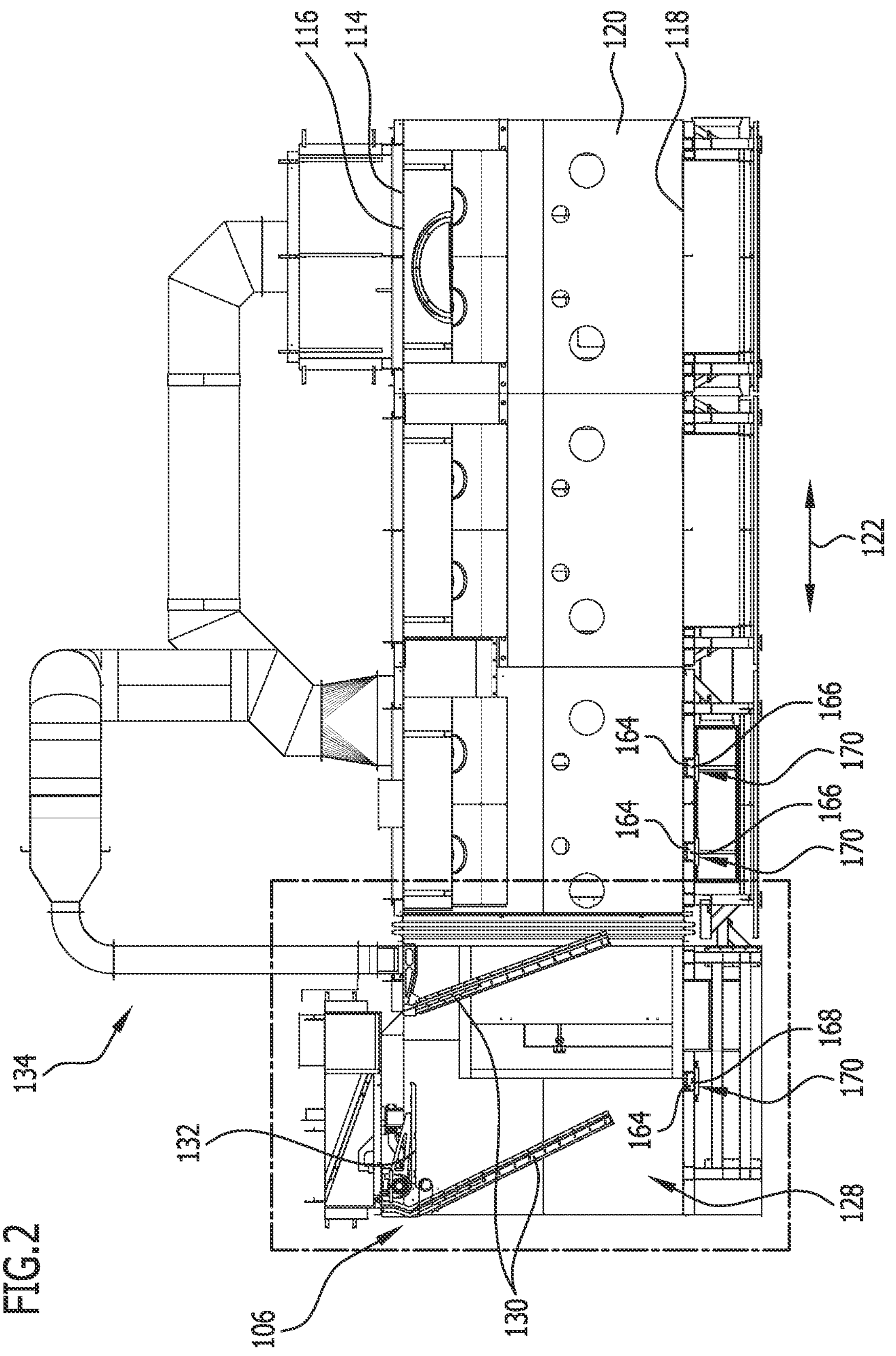
FIG. 2 shows a schematic vertical longitudinal cross-section through the treatment installation from FIG. 1.
Figure 3:
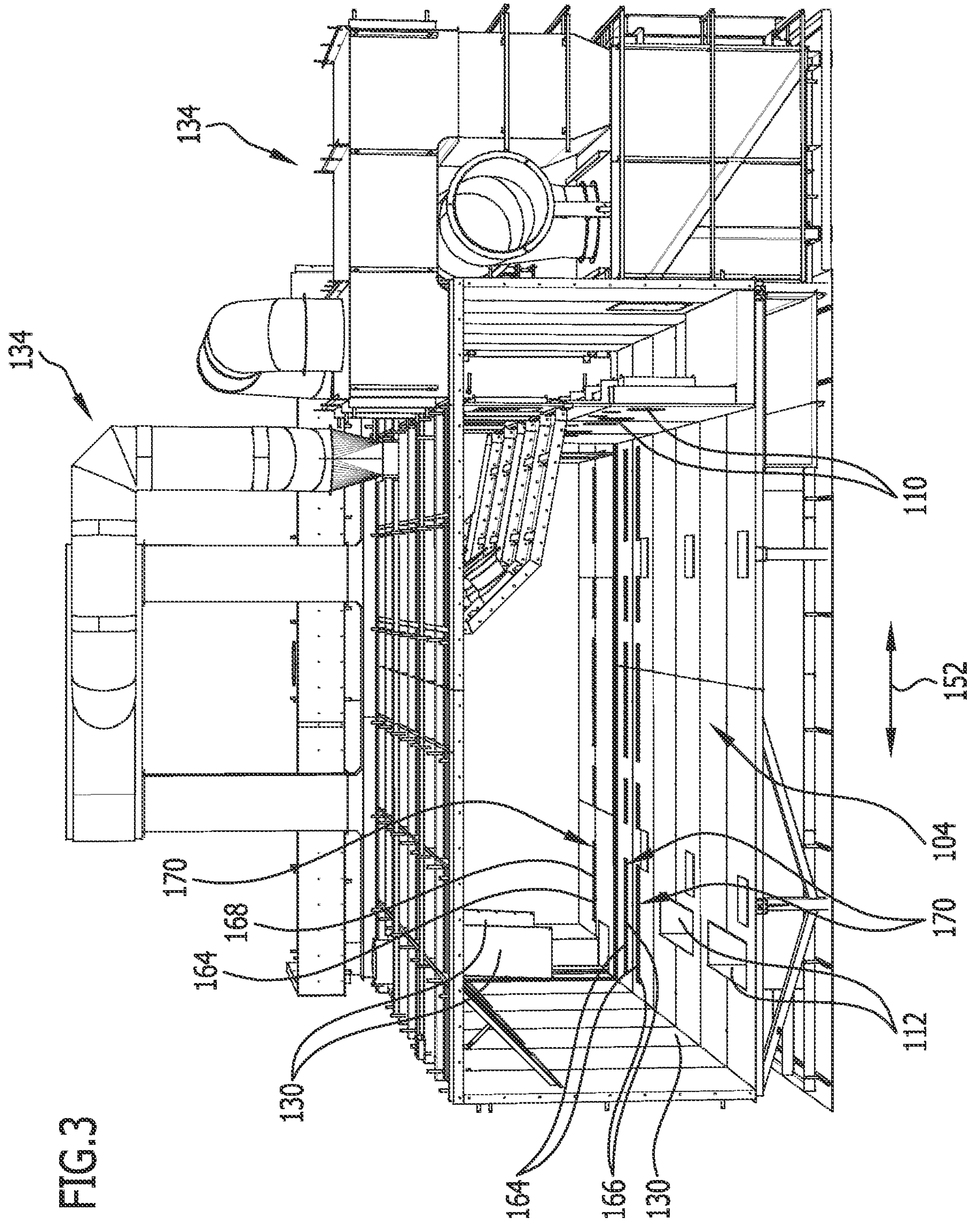
FIG. 3 shows a schematic vertical cross-section through the treatment installation from FIG. 1.

A further or alternative optimization of the separating effect can be obtained by the separating device 106 comprising one or more floor extraction devices, for example formed as suction slots 164 (see in particular FIGS. 2 to 4).

In this case, on the one hand, an extraction device 166 which is arranged upstream or downstream with respect to a conveying direction or connecting direction can be provided outside the connecting region 128, by means of which extraction device a separating fluid flow can be sucked in the direction of one of the spatial regions 102, in particular in the direction of a treatment space 104. In particular, this can counteract a thermal pressure resulting from an increased temperature in the spatial region 102. In addition, the formation of a flow eddy can thereby preferably be optimized.

Furthermore, an intermediate extraction device 168 can preferably be formed by means of one or more floor extraction devices, in particular by means of one or more suction slots 164. In particular, a suction slot 164 is arranged between the two guide devices 130 in relation to the conveying direction 122.

The suction slot 164 is preferably arranged and/or formed in the floor wall 118 of the connecting region 128 in such a way that a separating fluid flow emitted by means of one of the guide devices 130 is directed onto the suction slot 164. By means of this guide device 130, which is arranged in particular on a side of the separating device 106 facing away from the treatment space 104, fresh air in particular can be guided in the direction of the suction slot 164, wherein this fresh air is preferably at least partially extracted by means of the suction slot 164 in order to supply said fresh air back to the associated supply device 134 as recycled fresh air and to introduce it again into the connecting region 128 with the same guide device 130.

By means of the intermediate extraction device 168, a separating fluid recirculation 170 is thus formed in particular in order to reduce the requirement for fresh air and nevertheless to enable a large fresh air volume flow.

As a result of these optimizations, a movable baffle element 132 can optionally be dispensed with.

Figure 7:
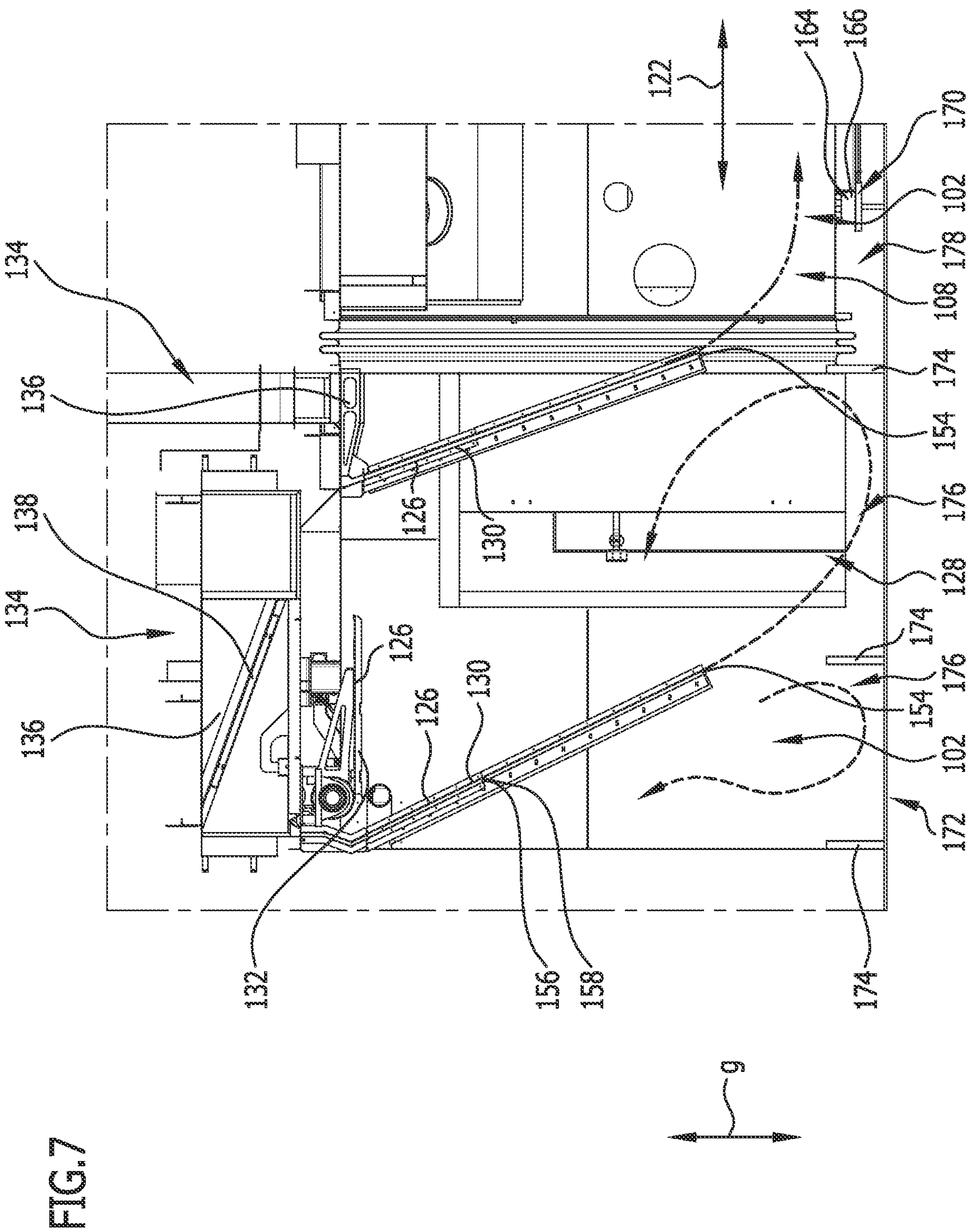
FIG. 7 shows a view corresponding to FIG. 4 of an alternative embodiment of a floor region of the separating device.

FIG. 7 shows a representation of the separating device 106 corresponding to FIG. 4, wherein an alternative embodiment of a floor region 172 is provided. This alternative embodiment can be provided in particular as a complete replacement for the above-described embodiment or as a supplement for this. For example, intermediate extraction devices 164 can optionally be supplemented or omitted.

It can be provided that the separating device 106 comprises one or more blocking elements 174, which influence the spreading of a flow, in particular blocking or deflecting locally.

The blocking elements 174 are in particular a component of a blocking device or form such a blocking device.

The one or more blocking elements 174 preferably reduce or prevent spreading of one or more separation fluid flows into at least one of the two spatial regions adjacent to the connecting region 128.

A deflection region 176 is preferably formed between each two blocking elements 174. In particular, three blocking elements 174 and two deflection regions 176 arranged in between are provided.

The blocking elements 174 are preferably arranged one after the other along the conveying direction 122 and spaced apart from one another.

The blocking elements 174 are preferably formed substantially plate-like, in particular as baffle plates, and/or are oriented at least approximately perpendicular to the conveying direction 122.

The one or more blocking elements 174 each preferably extend over at least approximately 40%, preferably at least approximately 60%, in particular at least approximately 80%, of a clear overall width of the connecting region 128 taken in the transverse direction 152.

A distance between two blocking elements 174 following directly upon one another is preferably at least approximately 50%, in particular at least approximately 80%, for example at least approximately 100%, and/or at most approximately 200%, preferably at most approximately 150%, of a total extension of a guide device 130 along the conveying direction 122. In particular, the formation of a flow eddy advantageous for the separating effect of the separating device 106 can hereby be optimized.

It can be advantageous if a blocking element 174 is arranged in relation to the conveying direction 122 at least approximately in a region of an upper end of one of the guide devices 130 and a further blocking element 174 is arranged in relation to the conveying direction 122 at least approximately in a region of a lower end of the same guide device 130. In particular, a flow eddy forming below this guide device 130 can thereby be produced. A distance of these two blocking elements 174 from one another is, for example, at least approximately 700 mm, in particular at least approximately 850 mm, and/or at most approximately 1200 mm, preferably at most approximately 1000 mm. This guide device 130 serves in particular to guide fresh air and/or to form one or two fresh air eddies.

An arrangement in a "region" is to be understood in particular as a deviation of the position along the conveying direction 122 of at most approximately 30 cm, in particular at most approximately 15 cm.

Furthermore, a blocking element 174, in particular a third blocking element 174, can be arranged at least approximately in a region of a lower end of a further one of the guide devices 130 in relation to the conveying direction 122. In combination with the previously described two blocking elements 174, a flow eddy can then in particular be produced between the two guide devices 130. A distance of this blocking element 174 from the closer of the two further blocking elements 174 is, for example, at least approximately 1000 mm, in particular at least approximately 1200 mm, and/or at most approximately 1500 mm, preferably at most approximately 1400 mm. This further guide device 130 serves in particular to guide circulating air, wherein the circulating air flows into a inflow region 178, in particular into a drying chamber of a dryer, in particular via the third blocking element 174.

LIST OF REFERENCE SIGNS

100 Treatment installation
102 Spatial region
104 Treatment space
106 Separating device
108 Treatment space portion
110 Supply opening
112 Discharge opening
114 Housing
116 Ceiling wall
118 Floor wall
120 Side wall
122 Conveying direction
126 Baffle
128 Connecting region
130 Guide device
132 Baffle element
134 Supply device
136 Fluid chamber
138 Filter element
140 Outlet opening
142 Inlet opening
144 Guide element
146 Guide plate
148 Upper end
150 Lower end
152 Transverse direction
154 Slotted nozzle
156 Supply opening
158 Supply slot
160 Shaft
162 Axis of rotation
164 Suction slot
166 Upstream or downstream extraction device
168 Intermediate extraction device
170 Separating fluid recirculation
172 Floor region
174 Blocking element
176 Deflection region
178 Inflow region
g Direction of gravity

The invention claimed is:

1. A treatment installation for treating workpieces, the treatment installation comprising:
- a treatment space for treating workpieces, which includes one or more treatment space portions; and
- at least one separating device for separating two spatial regions, the at least one separating device including:
  - one or more guide devices, by which at least one separating fluid can be introduced into a connecting region arranged or formed between the two spatial regions, wherein at least one treatment space portion forms one of the spatial regions, which can be separated from another of the spatial regions by the at least one separating device, and wherein a lower face of guide elements of the one or more guide devices is at least partially and/or at least approximately complementary to a conveying contour of the workpieces to be conveyed by the conveyor device.

2. The treatment installation according to claim 1, wherein the at least one separating device includes at least two guide devices for supplying at least two separating fluids to the connecting region.

3. The treatment installation according to claim 1, wherein the at least one separating device includes one or more floor extraction devices, wherein the one or more floor extraction devices are arranged between two guide devices of the at least one separating device or wherein the one or more floor extraction devices are arranged outside the connecting region.

4. The treatment installation according to claim 1, wherein the at least one separating device includes one or more floor extraction devices, wherein the one or more floor extraction devices are arranged and/or formed in an imaginary extension of one of the guide devices in a floor wall of the connecting region.

5. The treatment installation according to claim 1, wherein the at least one separating device includes at least two guide devices for supplying at least two separating fluids different from one another into the connecting region,
- wherein a first separating fluid can be supplied to the connecting region by a first of the guide devices, and
- wherein a second separating fluid can be supplied to the connecting region by a second of the guide devices.

6. The treatment installation according to claim 1, wherein the one or more guide devices are in each case designed as a fixed baffle element.

7. The treatment installation according to claim 1, wherein the one or more guide devices in each case include two guide elements.

8. The treatment installation according to claim 7, wherein the guide elements are oriented at least approximately parallel to one another and/or at a lower end in relation to a direction of gravity form a supply opening for supplying the at least one separating fluid to the connecting region.

9. The treatment installation according to claim 1, wherein the one or more guide devices are each arranged in such a way that an outflow direction of the separating fluid flowing out of a respective supply opening of the respective guide device runs obliquely to the direction of gravity and/or obliquely to a conveying direction and/or obliquely to a horizontal, wherein an angle between approximately 55° and approximately 80° is enclosed between the outflow direction and a horizontal running perpendicular to the direction of gravity and/or the conveying direction.

10. The treatment installation according to claim 1, wherein the plurality of guide devices are arranged relative to one another in such a way that outflow directions of the separating fluid flowing out of a respective supply opening of the respective guide device enclose different angles with the direction of gravity.

11. The treatment installation according to claim 1, wherein the at least one separating device includes a movable baffle element, which can optionally be introduced into or removed from the connecting region for selectively reducing or increasing an opening cross-section of the connecting region.

12. The treatment installation according to claim 11, wherein the movable baffle element is arranged between two of the guide devices in relation to a connecting direction, which is oriented substantially perpendicular to a separating plane separating the two spatial regions from one another.

13. The treatment installation according to claim 1, wherein a first of the spatial regions is a treatment space for treating workpieces and/or wherein a second of the spatial regions is a treatment space for treating workpieces, and wherein the first spatial region is a holding zone for holding the workpieces at a prespecified temperature and/or the second spatial region is a cooling zone for cooling the workpieces.

14. The treatment installation according to claim 1, wherein the at least one separating device includes one or more guide devices and two or more than two blocking elements arranged in a floor region of the at least one separating device, wherein one or more deflecting regions is formed between the blocking elements for deflecting one or more fluid flows and/or for forming one or more flow eddies.

15. The treatment installation according to claim 14, wherein:

a) directly below a guide device or in each case directly under each of the guiding devices; and/or b) in relation to a connecting direction between two guide devices a flow eddy is formed or can be formed.

16. The treatment installation according to claim 1, wherein the treatment installation includes a conveyor device for conveying the workpieces, which conveyor device extends through the separating device in a conveying direction of the conveyor device.

17. A method for treating workpieces, the method comprising:

separating two spatial regions from one another by at least one separating device of the treatment installation according to claim 1; and conveying workpieces through the at least one separating device.

* * * * *